US012533278B2

(12) United States Patent
Davis et al.

(10) Patent No.: US 12,533,278 B2
(45) Date of Patent: Jan. 27, 2026

(54) ROBUST FUNERARY TRAY

(71) Applicant: Vandor Group, Inc., Richmond, IN (US)

(72) Inventors: Justin F. Davis, Richmond, IN (US); Trevor E. Mace, Terre Haute, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

(21) Appl. No.: 18/478,336

(22) Filed: Sep. 29, 2023

(65) Prior Publication Data

US 2024/0108527 A1 Apr. 4, 2024

Related U.S. Application Data

(60) Provisional application No. 63/411,936, filed on Sep. 30, 2022.

(51) Int. Cl.
*A61G 17/00* (2006.01)
*A61G 17/007* (2006.01)

(52) U.S. Cl.
CPC ........ *A61G 17/004* (2016.11); *A61G 17/0073* (2013.01)

(58) Field of Classification Search
CPC .............. A61G 17/004; A61G 17/0073; A61G 17/007; A61G 17/042; A61G 17/001; A61G 17/0106; B65D 5/12; B65D 5/62; B65D 15/22; B65D 15/24; B65D 1/34
See application file for complete search history.

(56) References Cited

U.S. PATENT DOCUMENTS

| | | | | |
|---|---|---|---|---|
| 768,481 A * | 8/1904 | Post | A61G 17/0073 | 27/6 |
| 3,761,011 A * | 9/1973 | Reifers | B65D 1/34 | 229/407 |
| 4,765,535 A * | 8/1988 | Michetti | B65D 5/68 | 229/172 |
| 4,800,631 A * | 1/1989 | Pellmann | A61G 17/0136 | 27/7 |

(Continued)

FOREIGN PATENT DOCUMENTS

GB 2346137 A 8/2000

OTHER PUBLICATIONS

Extended European Search Report corresponding to European Patent Application No. 23200895.3, dated Nov. 13, 2023. (8 Pages).

*Primary Examiner* — William L Miller
(74) *Attorney, Agent, or Firm* — Maginot, Moore & Beck LLP

(57) ABSTRACT

A second embodiment is a funerary tray that includes a bottom wall, side walls, and end walls. The bottom wall is formed at least in part from a rigid first material and defines a length and a width. Each of the side walls extends substantially vertically upward from long edges of the bottom wall. Each of the end walls extends substantially vertically upward from short edges of the bottom wall, such that the bottom wall, side walls, and end walls form a tray having a length and width configured to receive an adult human body. The first side wall has a side wall length that is substantially the length of the tray, and includes a rigid section extending a first length that is less than the side wall length, and at least a first corrugated fiberboard section having a second length that is less that the side wall length.

17 Claims, 7 Drawing Sheets

(56) References Cited

U.S. PATENT DOCUMENTS

| | | | | | |
|---|---|---|---|---|---|
| 5,165,539 | A * | 11/1992 | Weber | A61L 2/26 206/439 |
| 5,353,484 | A * | 10/1994 | Woedl | A61G 17/0073 27/35 |
| 5,661,879 | A | 9/1997 | Kelly | |
| 5,771,548 | A * | 6/1998 | Jenkins | A61G 17/004 27/4 |
| 5,771,549 | A * | 6/1998 | Saaf | A61G 17/00 27/4 |
| 5,815,898 | A * | 10/1998 | Jenkins | A61G 17/007 27/19 |
| 6,105,220 | A * | 8/2000 | Belanger | A61G 17/0073 27/19 |
| 6,145,175 | A * | 11/2000 | Enneking | B65D 5/68 27/19 |
| 6,314,626 | B1 * | 11/2001 | Becker | A61G 17/0106 217/65 |
| 7,337,484 | B2 * | 3/2008 | Cox | A61G 1/01 128/870 |
| 7,434,298 | B2 * | 10/2008 | De La Fuente | A61G 17/0136 27/19 |
| 7,581,293 | B1 * | 9/2009 | Allen | A61G 17/042 27/19 |
| 8,356,392 | B2 * | 1/2013 | Jackson | A61G 17/004 27/4 |
| 8,375,534 | B2 * | 2/2013 | Gesell | A61G 17/004 217/65 |
| 8,375,535 | B2 * | 2/2013 | Cox | A61G 17/004 220/666 |
| 8,997,319 | B2 * | 4/2015 | Jenson | A61G 17/004 229/101 |
| 9,021,668 | B2 * | 5/2015 | Hui | A61G 17/0073 27/14 |
| 9,056,040 | B2 * | 6/2015 | Gesell | B65D 5/64 |
| 9,233,044 | B2 * | 1/2016 | Malandra | B32B 37/182 |
| 9,649,240 | B2 * | 5/2017 | Cox | A61G 17/0073 |
| 10,500,117 | B2 * | 12/2019 | Davis | A61G 17/034 |
| 11,039,972 | B2 * | 6/2021 | Davis | A61G 17/042 |
| 11,141,338 | B2 * | 10/2021 | Davis | A61G 17/042 |
| 11,160,711 | B2 * | 11/2021 | Hirayama | A61G 17/0073 |
| 2005/0050701 | A1 * | 3/2005 | Davis | A61G 17/045 27/28 |
| 2007/0084028 | A1 * | 4/2007 | Cox | A61G 17/004 27/4 |
| 2009/0172931 | A1 * | 7/2009 | Rosato | A61G 17/007 27/4 |
| 2011/0000059 | A1 | 1/2011 | Davis et al. | |
| 2012/0084952 | A1 | 4/2012 | Hobstetter | |
| 2013/0160258 | A1 * | 6/2013 | Davis | A61G 17/0073 27/2 |
| 2014/0026378 | A1 * | 1/2014 | Gessel | A61G 17/0073 27/14 |
| 2014/0123450 | A1 * | 5/2014 | Jenson | A61G 17/004 27/14 |
| 2014/0230203 | A1 * | 8/2014 | Cox | A61G 17/047 27/4 |
| 2015/0149367 | A1 * | 5/2015 | Thacker | A61G 17/041 705/307 |
| 2017/0209326 | A1 * | 7/2017 | Davis | A61G 17/044 |
| 2017/0281448 | A1 * | 10/2017 | Davis | A61G 17/047 |
| 2020/0146919 | A1 * | 5/2020 | Davis | A61G 17/0073 |
| 2020/0146920 | A1 * | 5/2020 | Davis | A61G 17/0073 |
| 2021/0121351 | A1 * | 4/2021 | Garvin | A61G 17/044 |
| 2021/0121352 | A1 * | 4/2021 | Davis | A61G 17/042 |
| 2022/0040023 | A1 * | 2/2022 | Davis | A61G 17/001 |
| 2023/0404832 | A1 * | 12/2023 | Davis | A61G 17/042 |
| 2024/0009056 | A1 * | 1/2024 | Davis | A61G 17/004 |
| 2024/0374452 | A1 * | 11/2024 | Wilber | A61G 17/0106 |
| 2025/0263197 | A1 * | 8/2025 | Caunegre | B31B 50/81 |

* cited by examiner

ROBUST FUNERARY TRAY

This application claims the benefit of U.S. provisional patent application Ser. No. 63/411,936, filed Sep. 30, 2022, the disclosure of which is incorporated herein by reference in its entirety.

FIELD OF THE INVENTION

The present invention relates generally to funereal products, and particularly for funerary trays.

BACKGROUND

Funerary trays are low profile trays that have a length and width similar to a standard casket, but with a reduced height. Funerary trays can be used as inserts to a ceremonial rental casket or bed viewer. Funeral trays can furthermore be used as a mechanism for transporting a body by air, and/or as body carriers for cremation. As such, funerary trays are often made of low cost wood material, or even completely of corrugated paper (corrugated fiberboard).

Corrugated paper funerary trays, such as those disclosed in U.S. Pat. Nos. 7,337,484 and/or 8,375,535, have the advantage of extremely low cost. Thus, corrugated paper funerary trays enjoy significant use in connection with ceremonial rental caskets and bed viewers, and as basic containers used in the cremation market. In one common practice, the deceased is displayed in an ornate ceremonial rental casket while disposed on the funerary tray. After the viewing and any services, the funerary tray and the deceased are removed from the ceremonial rental casket and transported to the crematory.

While corrugated paper trays can be configured to have adequate strength for the purposes of conveying a deceased, in some situations it is desirable to have the increased strength of a wooden bottomed structure. Some crematories prefer the use of a wood bottom due to the use of accordion style church trucks. Also, certain jurisdictions require the use of a wood body carrier by law. A typical wood tray has pine plank sides coupled to a plywood sheet bottom, or a bottom formed of engineered wood or a rigid fiber composite product.

One drawback to wood-based funerary trays is the increased material costs. It is for this reason that corrugated paper trays are often favored. It would be desirable, therefore, to provide a funerary tray that enjoys both the perceived and real strength advantages of wood-based trays, without the full material cost of a traditional wooden funerary tray.

SUMMARY

At least some embodiments disclosed herein addresses the above need by providing a funerary tray having wood-based (or other rigid) structural elements that have a length that is less than the length of the tray, such that the wood-based products may be cut from standard lengths without producing excess scrap. It will be appreciate that the terms “wood” as used herein includes wood or rigid fiber composite materials and other materials as set forth further below.

A first embodiment is funerary tray that includes a bottom wall, side walls, and end walls. The bottom wall formed at least in part from a rigid first material and defines a length and a width. Each of the side walls extends substantially vertically upward from long edges of the bottom wall. Each of the end walls extends substantially vertically upward from short edges of the bottom wall, such that the bottom wall, side walls, and end walls form a tray having a length and width configured to receive an adult human body. The funerary tray may suitably further include a skin formed of a flexible second material. The skin extends over the side walls and end walls, and at least under a portion of the bottom wall. The first material has a higher hardness than the second material.

A second embodiment is a funerary tray that includes a bottom wall, side walls, and end walls. The bottom wall is formed at least in part from a rigid first material and defines a length and a width. Each of the side walls extends substantially vertically upward from long edges of the bottom wall. Each of the end walls extends substantially vertically upward from short edges of the bottom wall, such that the bottom wall, side walls, and end walls form a tray having a length and width configured to receive an adult human body. The first side wall has a side wall length that is substantially the length of the tray, and includes a rigid section extending a first length that is less than the side wall length, and at least a first corrugated fiberboard section having a second length that is less that the side wall length.

A third embodiment is a funerary tray that includes a bottom wall, end frames, and side sections. The bottom wall is formed of a rigid material, and has first and second long edges and first and second short edges. The first end frame is formed of corrugated fiberboard, and is coupled to the bottom wall and extends upward from at least the first short edge to form a first end wall. The second end frame is also formed of corrugated fiberboard, and is coupled to the bottom wall and extends upward from at least the second short edge to form a second end wall. The first side section extends along the first long edge and between the first end frame and the second end frame to form at least a portion of a first side wall. The second side section extending along the second long edge and between the first end frame and the second end frame to form at least a portion of a second side wall.

Other embodiments include methods of making and/or using the above referenced structures.

The above-described features and advantages, as well as others, will become more readily apparent to those of ordinary skill in the art by reference to the following detailed description and accompanying drawings.

DETAILED DESCRIPTION

Figure 1:
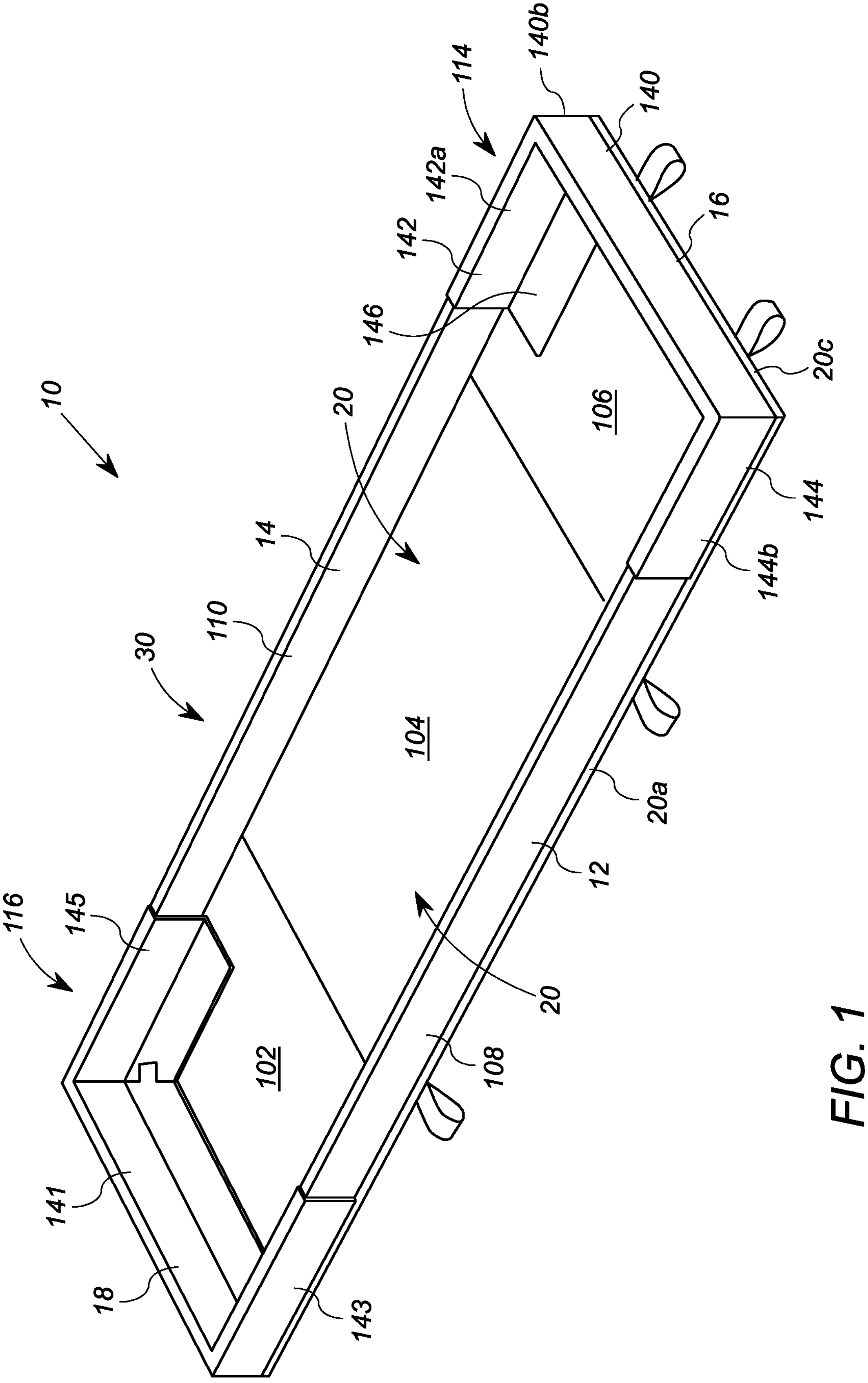
FIG. 1 shows a perspective view of a funerary tray according to a first embodiment.
Figure 2:
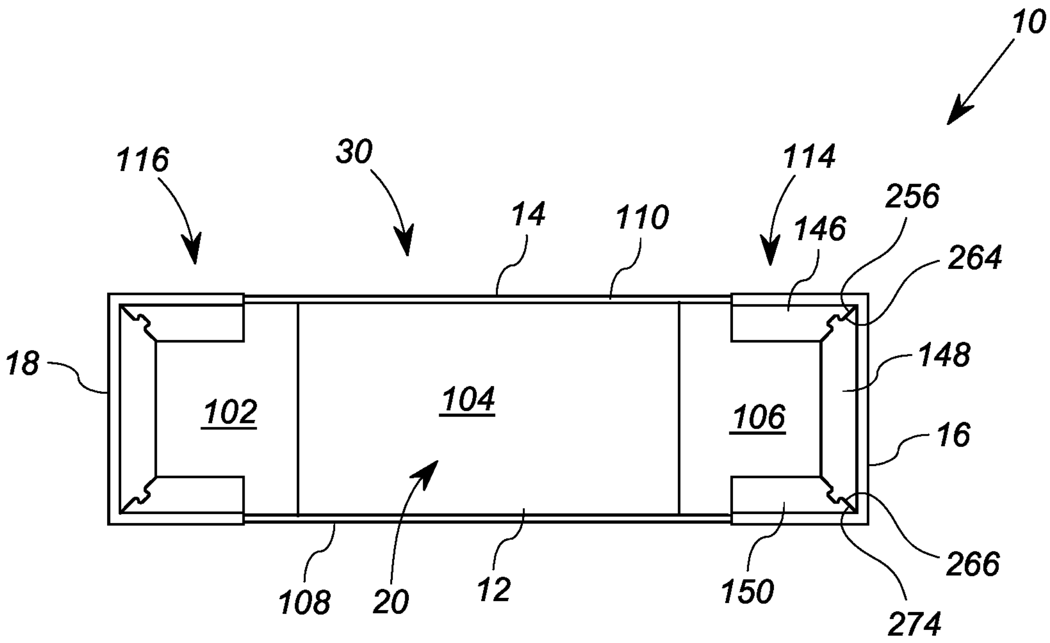
FIG. 2 shows a top plan view of the funerary tray of FIG. 1.

FIG. 1 shows a perspective view of a funerary tray 10 according to a first embodiment, and FIG. 2 shows a top plan view of the funerary tray 10. The funerary tray 10 includes a first side wall 12, a second side wall 14, a first end wall 16, a second end wall 18 and a bottom wall 20. The bottom wall 20 formed at least in part from a rigid first material and defines a length and a width of the tray 10. In this embodiment, the bottom wall 20 is rectangular in shape an includes two long edges 20*a*, 20*b* and two short edges 20*c*, 20*d*. Only long edges 20*a*, 20*c* are visible in FIG. 1. The edges 20*b*, 20*d* are visible in FIGS. 4 and 5, discussed further below.

Each of the first and second sidewalls 12 and 14, respectively, is coupled to and extends substantially vertically upward from long edges 20*a*, 20*b* of the bottom wall 20. Similarly, each of the first and second end walls 16 and 18, respectively, is coupled to and extends vertically upward from the short edges 20*c*, 20*d* of the bottom wall. The first side wall 12 extends from a first end of the end wall 16 to a first end of the end wall 18, and the second side wall 14 extends from a second end of the end wall 16 to a second end of the end wall 18. As a consequence, the side walls 12, 14 and end walls 16, 18 cooperate with the bottom wall 20 to form the tray 10.

Figure 10:
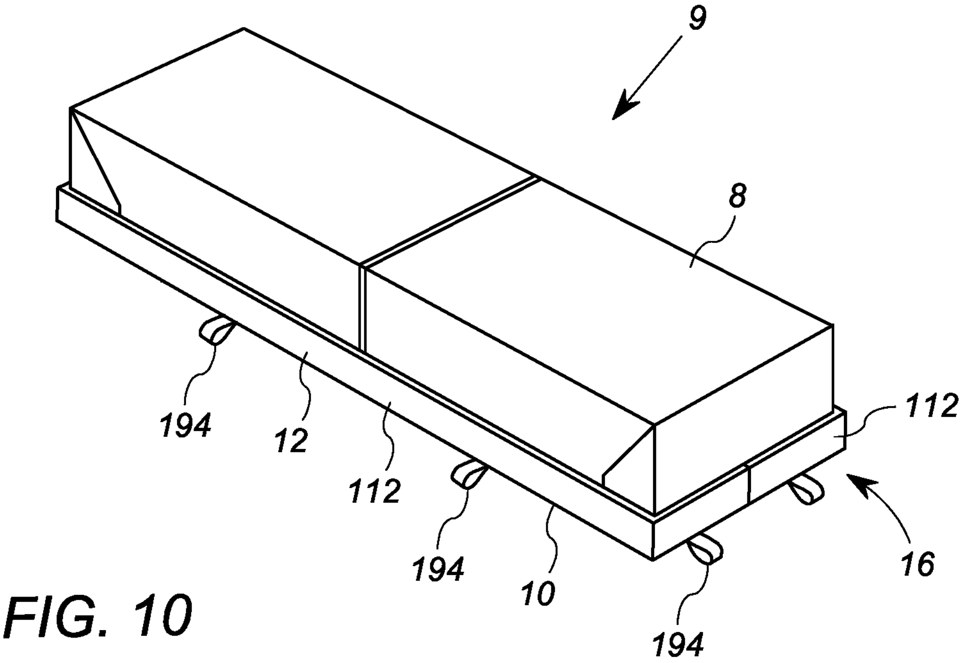
FIG. 10 shows a perspective view of the funerary tray of FIG. 3 with a lid assembled thereto to form a casket.

The tray 10 has a length and width configured to receive an adult human body in the supine position. The height of the side walls 12, 14 and end walls 16, 18 do not necessarily have a height to contain an adult human body. However, a lid, not shown in FIG. 1, may be adapted to provide additional interior height to accommodate the body. FIG. 10 shows the funerary tray 10 with the lid 8 affixed thereto.

Figure 3:
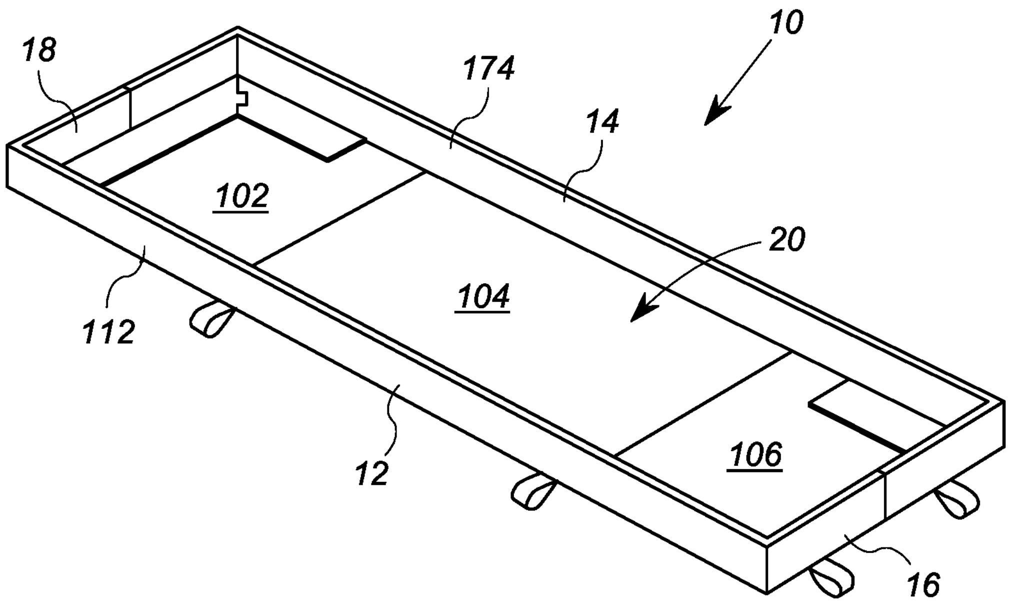
FIG. 3 shows a perspective view of the funerary tray of FIG. 1 in an embodiment that includes an outer skin or wrap.

FIG. 3 shows a perspective view of an embodiment of the funerary tray 10 that further includes a flexible wrap or skin 112. The skin 112 extends over the first and second side walls 12, 14, over the first and second end walls 16, 18, and at least under a portion of the bottom wall 20. The skin 112 is formed of a material that has a lower hardness or stiffness than the rigid first material. In this embodiment, the skin 112 is formed of a flexible (i.e. foldable) material such as corrugated paper or corrugated fiberboard, for example, single-wall corrugated fiberboard.

Referring again to FIGS. 1 and 2, the tray 10 is formed from a rigid subassembly 30, a first end frame 114, and a second end frame 116. As will be discussed below in detail, each of the first side wall 12 and second side wall 14 is formed by part of the rigid subassembly 30 and parts of each of the first and second end frames 114 and 116. The first end wall 16 is formed by part of the first end frame 114, and the second end wall 18 is formed by part of the second end frame 116. The bottom wall is formed by part of the rigid subassembly 30.

Figure 4:
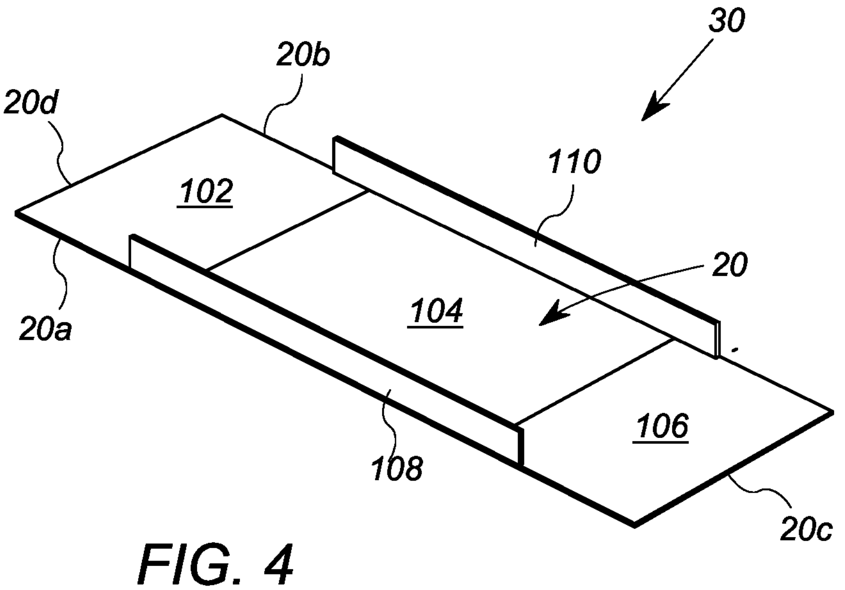
FIG. 4 shows a perspective view of a rigid subassembly of the funerary tray of FIGS. 1 and 3.
Figure 5:
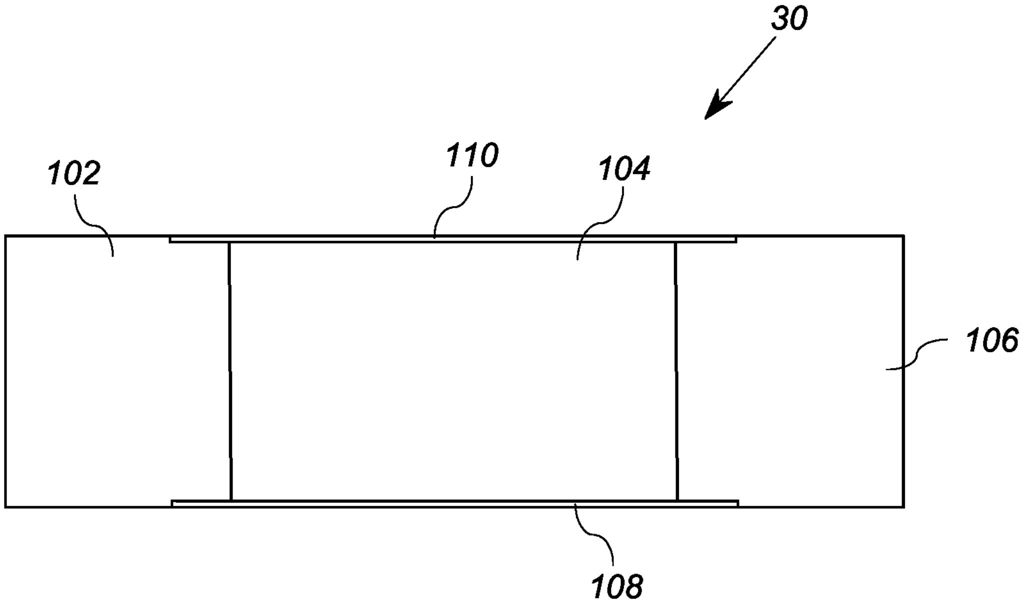
FIG. 5 shows a top plan view of the rigid subassembly of FIG. 4.

In particular, FIG. 4 shows a perspective view of a rigid subassembly 30 of the tray 10 that includes the bottom wall 20, and further includes side planks 108 and 110. FIG. 5 shows a top view of the rigid subassembly 30. In this embodiment, the bottom wall 20 is formed by wood or rigid fiber composite sheets 102, 104 and 106 that are shaped to form the bottom wall 20 when connected end-to-end, as shown in FIGS. 4 and 5. More specifically, each of the wood or rigid fiber composite sheets 102, 104, and 106 is a flat sheet formed of plywood, particle board, OSB board, or other engineered wood or rigid fiber composite-based material. Such materials are referred to interchangeably herein as rigid, and have a greater hardness (and/or are less flexible) than, for example, single-wall corrugated paper or corrugated fiberboard. Each of the sheets 102, 104 and 106 has a width corresponding to the width of the tray 10. The combined length of the sheets 102, 104 and 106 corresponds to the length of the tray 10. Thus, when the sheets 102, 104, and 106 are arranged end-to-end as shown in FIGS. 1, 2, 5 and 6, they collectively form the rigid bottom wall 20 of the tray 12.

Figure 11:
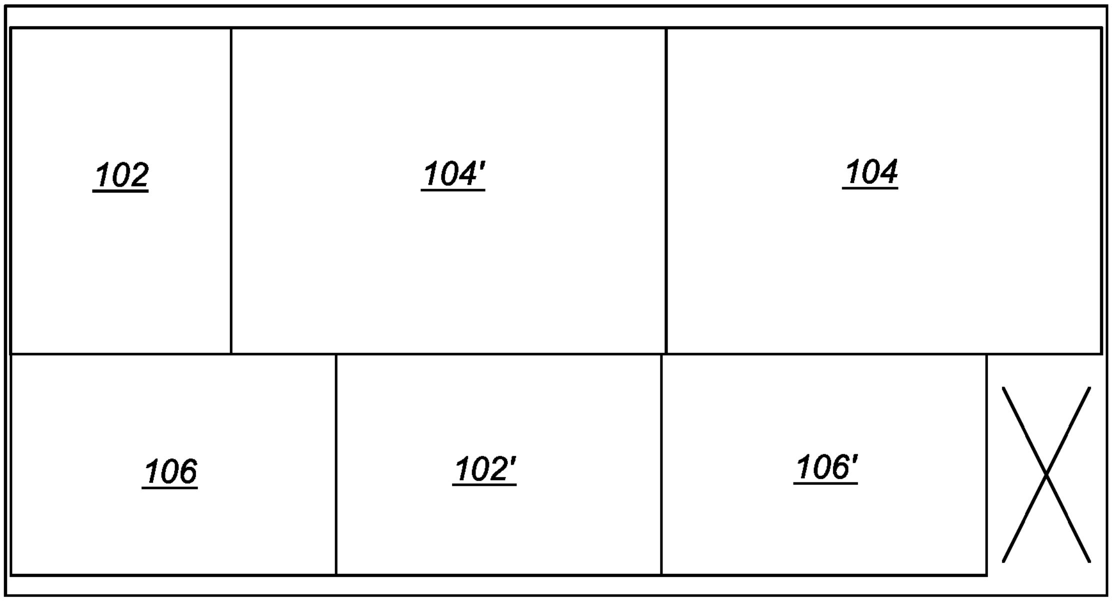
FIG. 11 shows a schematic top plan view of a cutting pattern used to generate the bottom portion of the wood subassemblies of two funerary trays.

It will be appreciated that the bottom wall 20 in other embodiments may be formed of a single sheet of rigid material, or a number of sheets other than three. Nevertheless, forming the bottom wall 20 of multiple sheets can help reduce waste, while retaining the strength of a rigid material. In this embodiment, referring again to FIGS. 1, 2, 4 and 5, the wood-based or wood-like sheets 102, 104 and 106 have dimensions that reduce waste by allowing the rigid sheets 102, 104 and 106 for two funerary trays having the design of the funerary tray 10 to be cut from a single 4-by-8 sheet of the wood or rigid fiber composite product. FIG. 11 shows a schematic diagram of a cutting pattern of a 4-by-8 wood or rigid fiber composite plank sheet for producing the rigid sheets 102, 104 and 106 of the funerary tray 10, as well as corresponding sheets 102', 104' and 106' of another tray.

Referring again to FIGS. 1 and 4, the rigid planks 108, 110 are operably coupled to and extend vertically upward from the middle sheet 104, and portions of each of the sheets 102, 106. The planks 108, 110 are disposed on opposite sides, and do not extend in this embodiment the entire length of the bottom wall 20 or long edges 20*a*, 20*b*, respectively. The wood or rigid fiber composite planks 108, 110 are preferably cut to 48 inches in length, so that they can be cut from 8 foot sections of wood or wood-like material with minimal scrap.

In practice the subassembly 30 may be formed by cutting the sheets 102, 104 and 106 from the 4-by-8 plank sheet shown in FIG. 11, and then assembling the sheets 102, 104, 106 into a single bottom wall 20. The side planks 108 and 110 may be cut from an 8-foot plank, not shown, and then affixed to the bottom wall 20. Another subassembly, not shown, but identical to the subassembly 30 may be constructed of the other sheets 102', 104' and 106' and additional side planks cut from another 8-foot plank.

Figure 6:
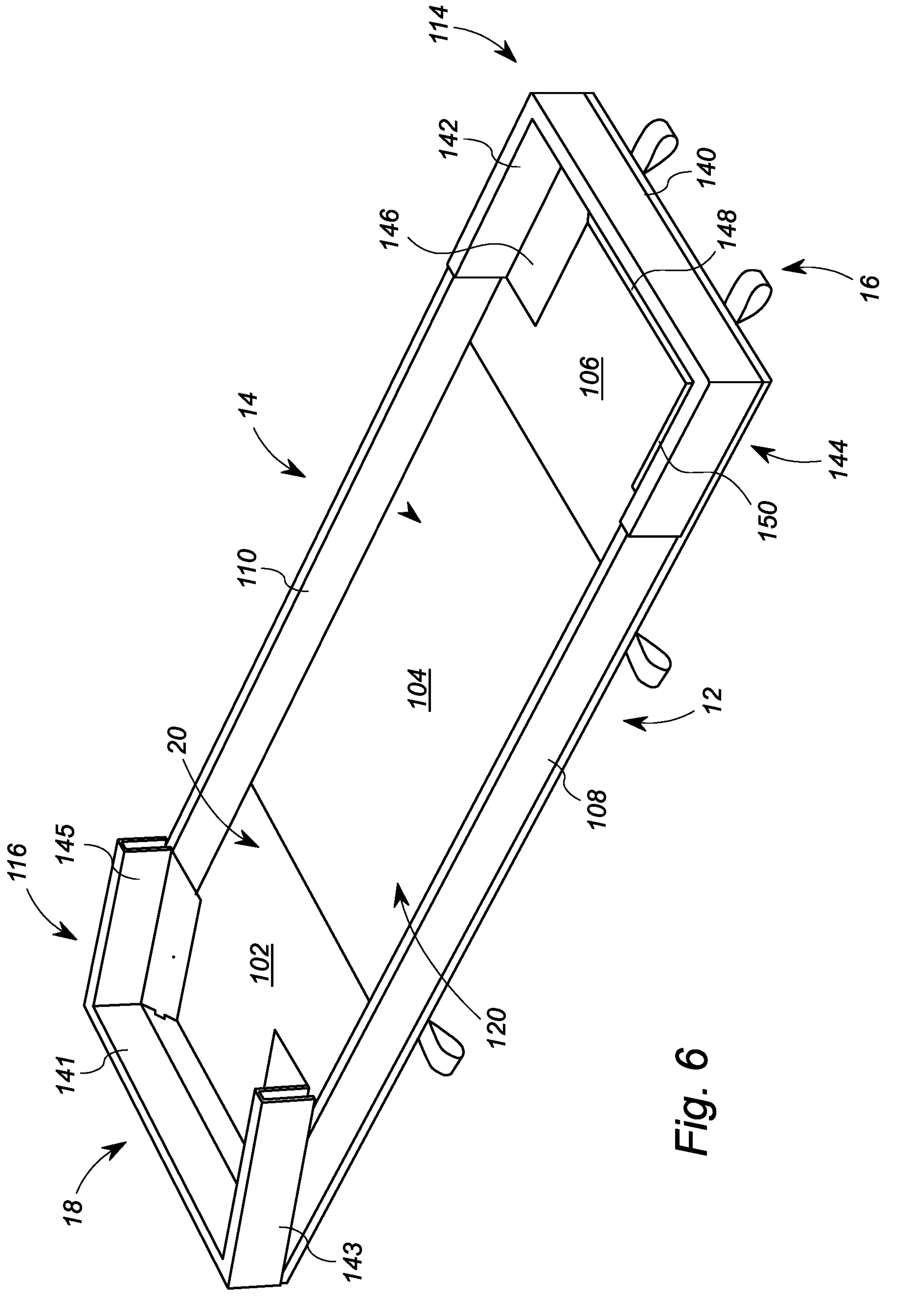
FIG. 6 shows a perspective view of the rigid subassembly of FIG. 4 and two end frames of the funerary tray of FIG. 1.

FIG. 6 shows a perspective view of the wood or rigid fiber composite subassembly 30 with the end frames 114, 116 partially assembled thereon. With reference to FIGS. 1, 2 and 6, the first end frame 114 is formed of folded corrugated fiberboard, and is coupled to the bottom wall 20. The first end frame 114 includes an end wall 140 that extends upward from at least the first short edge 20*c* to form the first end wall 16 of the tray 10. The first end frame 114 also includes a first side wall 142 that extends upward from adjacent portions of the long edge 20*b* to form a first end portion of the second side wall 14 of the tray 10, and a second side wall 144 that extends upward from portions of the long edge 20*a* to form a first end portion of the first side wall 12 of the tray 10.

The second end frame 116 may have the same structure, and likewise is formed of folded corrugated fiberboard. The second end frame 116 is coupled to the bottom wall 20 and includes an end wall 141 that extends upward from at least the second short edge 20*d* to form the second end wall 18 of the tray 10. The second end frame 116 also includes a first side wall 143 that extends upward from an adjacent portion of the long edge 20*a* to form a second end portion of the first side wall 12 of the tray 10, and a second side wall 145 that extends upward from a portion of the long edge 20*b* to form a second end portion of the second side wall 14 of the tray 10.

With reference to FIGS. 1 and 4, the first plank 108 that extends upward from the first long edge 20*a* extends lengthwise at least between the second side wall 144 of the first end frame 114 and the first side wall 143 of the second end frame 116 to form a middle portion of the first side wall 12 of the tray 10. Similarly, the second plank 110 that extends upward from the second long edge 20*b* extends lengthwise between the first side wall 142 of the first end frame 114 and the second side wall 145 of the second end frame 116 to form a middle portion of the second side wall 14 of the tray 10. In some embodiments, the first plank 108 and/or the second plank 110 can extend the entire length of the respective side walls 12, 14. It will also be appreciated that the first plank 108 and second plank 110 can be formed of a different rigid material from that of the bottom wall 20. The use of the end frames 114, 116 as parts of the side walls 12, 14 of the tray 10 allows for the rigid planks 108, 110 to have a reduced length, while still providing strength and structural support to the tray 10. As discussed above, the reduced length can result in reduced waste during manufacture.

Figure 7:
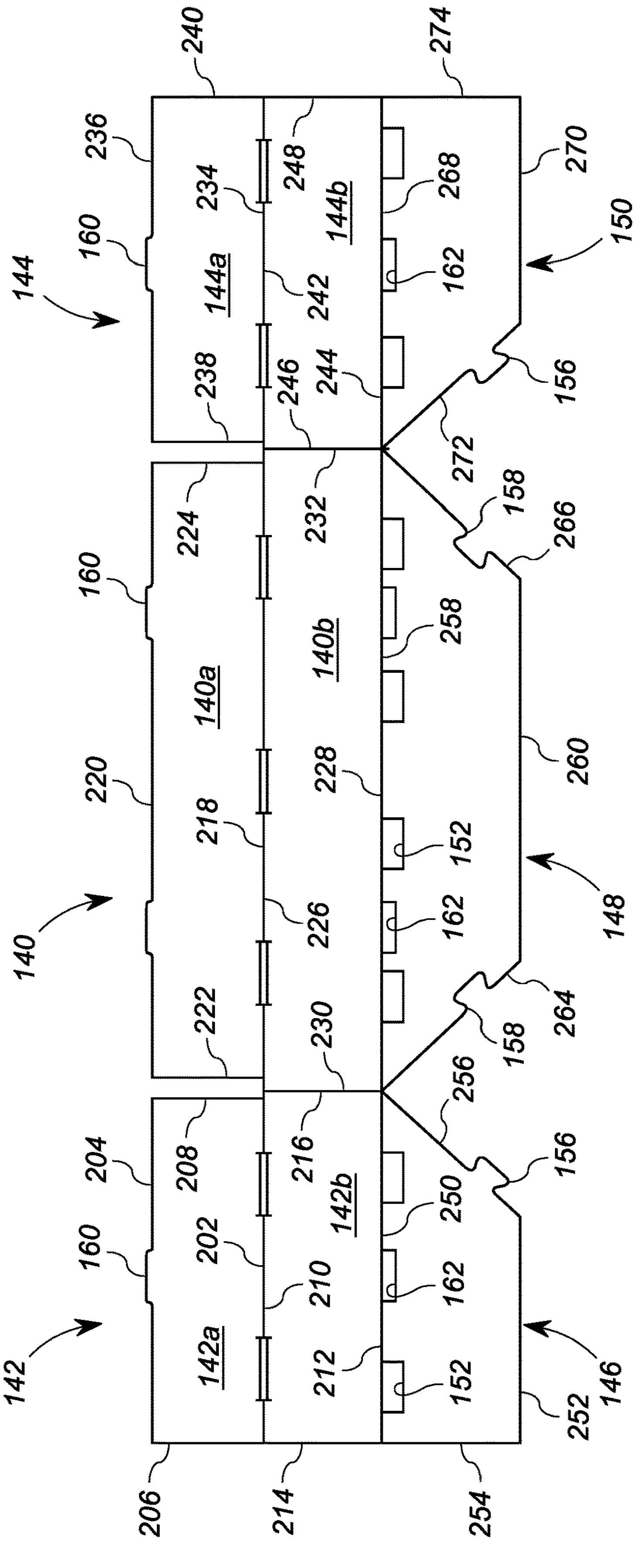
FIG. 7 shows a plan view of a corrugated fiberboard blank used to form an end frame of the funerary tray of FIG. 1.

As discussed above, each of the end frames 114, 116 is formed from a corrugated paper blank. FIG. 7 shows a corrugated paper blank 190 that is configured to be folded in this embodiment to form the first end frame 114. The second end frame 116 is formed from an identical blank in the same manner.

With reference to FIGS. 1, 2, 6, and 7, the first end frame 114 includes, in addition to the end wall 140 and two opposing side walls 142, 144, three interconnected floor segments 146, 148 and 150. The end wall 140 comprises two foldably connected rectangular panels 140*a*, 140*b* of the corrugated fiberboard blank 190 that are folded 180 degrees over onto each other along their long edges. The panel 140*a* forms the inner surface of the end wall 140, and the panel 140*b* forms the outer surface of the end wall 140. Similarly, the first side wall 142 comprises two foldably connected panels 142*a*, 142*b* of the corrugated fiberboard blank 190 that are folded over 180 degrees onto each other. The panel 142*a* forms the inner surface of the first side wall 142, and the panel 142*b* forms the outer surface of the first side wall 142. Likewise, the second side wall 144 comprises two foldably connected panels 144*a*, 144*b* of the corrugated fiberboard blank 190 that are folded 180 degrees over onto each other. The panel 144*a* forms the inner surface of the second side wall 144, and the panel 144*b* forms the outer surface of the second side wall 144.

With specific reference to FIG. 7, the end wall outer panel 140*b* is rectangular in shape, and has two opposing long edges 226, 228 and two opposing short edges 230, 232. The end wall inner panel 140*a* is also rectangular in shape, and has two opposing long edges 218, 220, and two opposing short edges 222, 224. The first side wall outer panel 142*b* is rectangular in shape, and has two opposing long edges 210, 212 and two opposing short edges 214, 216. The first side wall inner panel 142*a* is similarly rectangular in shape, and has two opposing long edges 202, 204 and two opposing short edges 206, 208. The second side wall outer panel 144*b* is rectangular in shape, and has two opposing long edges 242, 244 and two opposing short edges 246, 248. The second side wall inner panel 144*a* is likewise rectangular in shape, and has two opposing long edges 234, 236 and two opposing short edges 238, 240.

The long edge 210 of the first side wall outer panel 142*b* is foldably connected to the long edge 202 of the first side wall inner panel 142*a*. In this embodiment, the long edge 204 of the first side wall inner panel 142*a* includes an outward extending tab 160. The short edge 216 of the first side wall outer panel 142*b* is foldably coupled to the short edge 230 of the end wall inner panel 140*a*. Similarly, the long edge 242 of the second side wall outer panel 144*b* is foldably connected to the long edge 234 of the second side wall inner panel 144*a*. In this embodiment, the long edge 236 of the second side wall inner panel 144*a* also includes an outward extending tab 160. The short edge 246 of the second side wall outer panel 144*b* is foldably coupled to the short edge 232 of the end wall outer panel 140*b*.

The long edge 226 of the end wall outer panel 140*b* is foldably connected to the long edge 218 of the end wall inner panel 140*a*. The long edge 220 of the end wall inner panel 140*a* includes one or more of the tabs 160.

As a result of the foregoing connections, the outer panels 140*b*, 142*b* and 144*b* are formed from a continuous panel of the blank 190, and can be folded into the U-shape structure shown in FIGS. 1 and 6. In this embodiment, the inner panels 140*a*, 142*a* and 144*a* are not directly interconnected to each other in the blank 190, even though they are arranged in a similar layout as the panels 140*b*, 142*b* and 144*b*. Specifically, the edge 222 of the end wall inner panel 140*a* is proximate to, but not directly connected to and preferably spaced apart from, the edge 208 of the side wall inner panel 142*a*, and the opposite short edge 224 of the end wall inner panel 140*a* is proximate to, but not directly connected to and preferably spaced apart from, the short edge 238 of the side wall inner panel 144*a*. As will become more readily apparent further below, this configuration of the panels 140*a*, 142*a*, 144*a* facilitates the corner folds between the end wall 140 and each of the side walls 142, 144 to form the U-shape.

With continuing reference to FIG. 7, the floor segment 146 is a trapezoid-shaped panel that is foldably connected to the first side wall 142. Specifically, the floor segment 146 has two parallel opposing edges 250, 252, with the first edge 250 having a greater length than the second edge 252. The long edge 250 is foldably connected to the long edge 212 of the first side wall outer panel 142*b* and may run co-extensively therewith. The floor segment 146 has a short edge 254 that extends between first ends of the opposing edges 250, 252, and an angled edge 256 that extends between the second ends of the opposing edges 250, 252. The short edge 254 may suitably be co-linear with short edges 206 and 214 of the first side wall 142. The angled edge 256 is not co-linear or parallel to the short edges 216, 230, but rather extends at a non-perpendicular angle from the short edges 216, 230. The angled edge 256 further includes a bulbous tab 156 extending therefrom.

The floor segment 150 is similarly a trapezoid-shaped panel that is foldably connected to the second side wall 144. Specifically, the floor segment 150 has two parallel opposing edges 268, 270, with the first edge 268 having a greater length than the second edge 270. The first edge 268 is foldably connected to the long edge 244 of the second side wall outer panel 144*b* and may run co-extensively therewith. The floor segment 150 also has a short edge 274 that extends between first ends of the opposing edges 268, 270, and an angled edge 272 that extends between the second ends of the long edge 268, 270. The short edge 274 may suitably be co-linear with short edges 240 and 248 of the second side wall 144. The angled edge 272 is not co-linear or parallel to the short edges 232, 246, but rather extends at a non-perpendicular angle from the short edges 232, 246.

The floor segment 148 is a trapezoid-shaped panel that is foldably connected to the end wall 140. Specifically, the floor segment 148 has two parallel opposing edges 258, 260, and two opposite angled edges 264, 266. The first edge 258 has a greater length than the second edge 260. The first edge 258 is foldably connected to the long edge 228 of the end wall outer panel 140*b* and may run co-extensively therewith. The angled edge 264 extends in an angled manner between the first ends of edges 258 and 260, and the angled edge 266 extends in an angled manner between the second ends of the edges 258, 260. Each of the angled edges 264 has a receptacle 158 configured to receive the bulbous tabs 156.

In this embodiment, the adjacent angled edges 256, 264 are at approximately 90 degree angle with respect to each other such that, when the first side wall 142, second side wall 144 and end wall 140 are folded into a U-shape, and the floor segments 146, 148 and 150 are folded 90 degrees with respect to their respective walls 142, 140, 144, the adjacent edges 256, 264 meet to form a seam, as shown in FIG. 2. Similarly, the adjacent angled edges 266, 272 are at approximately 90 degree angle with respect to each other such that when the first side wall 142, second side wall 144 and end wall 140 are folded into a U-shape, and the floor segments 146, 148 and 150 are folded 90 degrees with respect to their respective walls 142, 140, 144, the edges 266, 272 meet to form a seam, as shown in FIG. 2. It will be appreciated that the angled edges 256, 264, 266, 272 do not have to be linear, and may have other complimentary shapes that interconnect or meet when the end frame 114 is fully constructed. In some embodiments, the floor panels 146, 148 and 150 do not even meet in the final folded end frame construction 114. However, providing floor panels 146, 148 and 150 such that they can be interconnected provides additional advantages of structural robustness, and ease of assembly.

Referring again to FIG. 7, the first edge 250 the floor panel 146 includes two large slots 152 and one small slot 162 formed therein. The first edges 258, 268 of respective floor panels 148, 150 include corresponding large slots 152 and small slots 162. As will be discussed below, these slots 152, 162 serve as receptacles for different connecting elements.

To construct the first end frame 114, the inner panels 142*a*, 140*a*, and 144*a* are folded 180 degrees over their respective foldably connected outer panels 142*b*, 140*b*, and 144*b*. The floor panels 146, 148, 150 are folded 90 degrees upward toward their respective foldably connected outer panels 142*b*, 140*b*, and 144*b*. The tab 160 on the inner panel 142*a* is then inserted into the slot 162 of the floor panel 146 to secure the first inner wall 142 and floor panel 146 of the end frame 114 in their assembled positions. The tabs 160 on the inner panels 140*a*, 144*a* are similarly inserted into the slots 162 of respective floor panels 148, 150. The first side wall 142 (and floor panel 146) are then rotated inward 90 degrees at the fold line between the edges 216, 230, and the second side wall 144 (and floor panel 150) are rotated inward 90 degrees at the fold line between edges 233, 246. When the first side wall 142 and second side wall 144 are rotated 90 degrees inward (and toward each other), they cooperate with the end wall 140 to form the U-shaped first end frame 114. The bulbous tabs 156 are furthermore coupled to the corresponding adjacent receptacles 158 to help hold the first end frame 114 in its assembled shape as shown in FIGS. 1, 2 and 6.

The second end frame 116 is constructed and assembled in the same manner.

As discussed above, and referring to FIGS. 2, 5 and 6 specifically, the first end frame 114 is assembled onto the rigid subassembly 30 such that the end wall 140 of the first frame 114 forms the first end wall 16 of the tray 10. Moreover, the first side wall 142 of the first end frame 114 extends to the plank 110 to help form the second side wall 14 of the tray 10, and the second side wall 144 of the first end frame 114 extends to the plank 108 to help form the first side wall 12 of the tray 10. The second end frame 116 is assembled onto the other end of the rigid subassembly 30 in an analogous manner.

Figure 8:
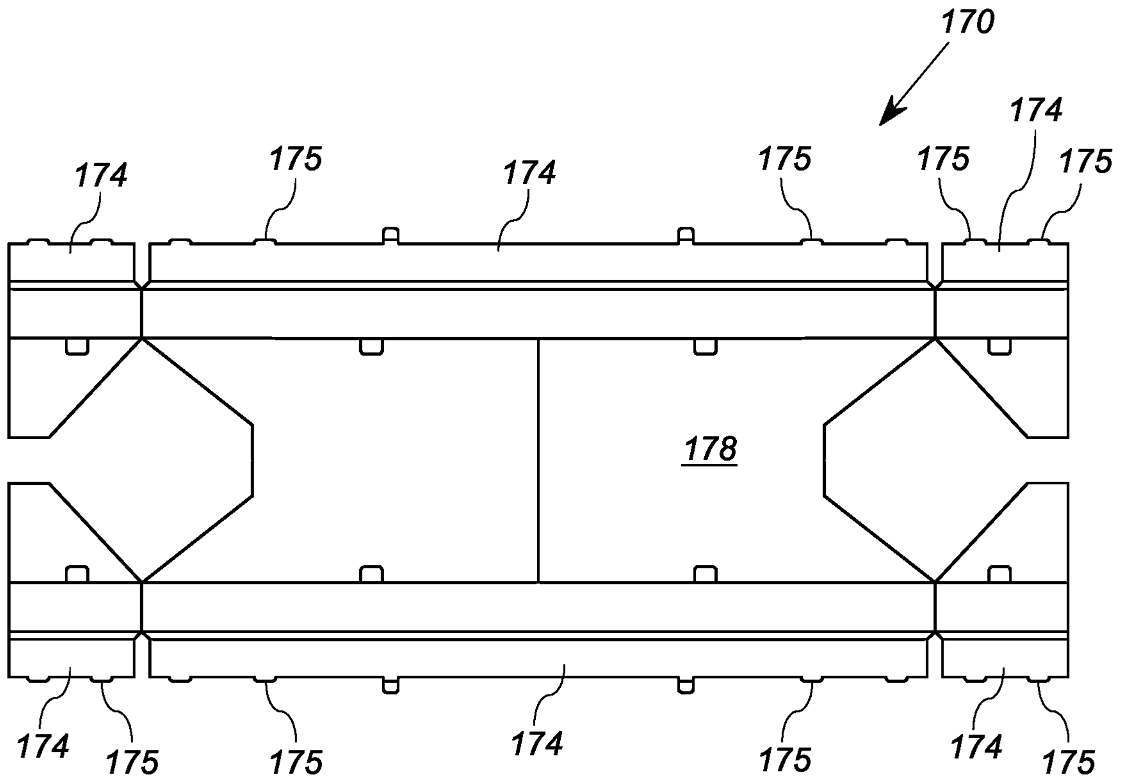
FIG. 8 shows a top plan view of a blank used to form the skin of the funerary tray of FIG. 3.
Figure 9:
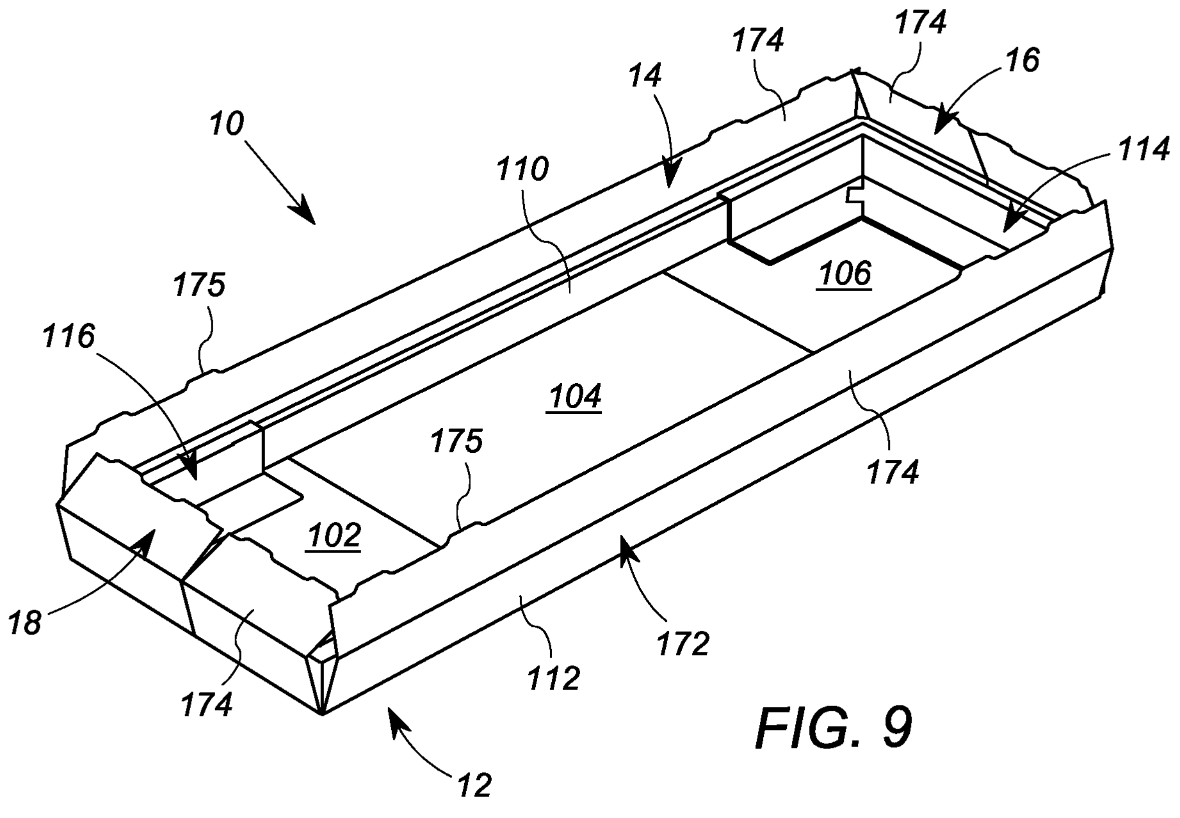
FIG. 9 shows a perspective view of the skin of the funerary tray of FIG. 3 partially assembled onto the tray of FIG. 1.

The skin 112 is formed from the blank 170 shown in FIG. 8. The blank 170 can be folded into open top box 172, with upstanding flaps 174, as shown in FIG. 9. The flaps 174 fold down to cover the side planks 108, 110, and the end fames 114, 116. The bottom 178 of the box 172 extends below and supports the wood or rigid fiber composite sheets 102, 104, 106. The flaps 174 include tabs 175 that fit into corresponding slots 152 of the end frames 114, 116. FIG. 3, as discussed above, shows the funerary tray 10 with the wrap or skin 112 fully assembled thereon. The skin 112 is suitably made from thin-walled corrugated fiberboard.

In the general assembly of the tray 10 of FIG. 3, after the wood or rigid fiber composite sheets 102, 104 and 106 are cut from the sheet of FIG. 11, they are assembled with the side planks 108, 110 to form the wood or rigid fiber composite (i.e., rigid) subassembly 30 of FIGS. 4 and 5. Alternatively, the wood or rigid fiber composite blanks could be positioned within the form of the skin blank 170. Two blanks 190 are assembled into the end frames 114, 116 as discussed above in connection with FIGS. 1, 2 and 7. The blank 170 is formed into the open top box 172 as discussed above. The end frames 114, 116 and wood or rigid fiber composite subassembly 30 are then assembled together within the open top box 172. FIG. 9 shows the open top box 172 with the assembled end frames 114, 116 and subassembly 30. The flaps 174 are then folded down over the side planks 108, 110, and the end fames 114, 116 and connected using the tabs 175. The resulting structure is the tray 10 of FIG. 3.

A liner, not shown, may be added. Such liners are known in the art and the liner may be, for example, a plastic liner, and/or a corrugated paper tray, such as a gusseted tray. The folded corrugated fiberboard lid 8 may also be added to form the final casket 9 shown in FIG. 8. Strap handles 194 may be stapled to the underside of the tray 112 to assist in manipulating the casket 9 and/or tray 10.

It will be appreciated that the above-described embodiments are merely illustrative, and that those of ordinary skill in the art may readily devise their own modifications and implementations that incorporate the principles of the present invention and fall within the spirit and scope thereof.

It will be appreciated that the tray 10 may be used in funerary final disposition, and may be used as an insert to a ceremonial rental casket or bed viewer. The tray 10 provides a strong wood or rigid fiber composite bottom, and wood or rigid fiber composite sides reinforced by corrugated end frames.

The invention claimed is:

1. A funerary tray comprising:

a bottom wall formed at least in part from a rigid first material and defining a length and a width;

first and second sidewalls, each of the first and second side walls extending substantially vertically upward from long edges of the bottom wall;

first and second end walls, each of the first and second end walls extending substantially vertically upward from short edges of the bottom wall, such that the bottom wall, first and second side walls, and first and second end walls form a tray having a length and width configured to receive an adult human body;

a skin formed of a flexible second material, the skin extending over the first and second side walls, over the first and second end walls, and at least under a portion of the bottom wall, wherein the first material is a non-corrugated material having a higher hardness than the second material; and wherein the second material is corrugated fiberboard.

2. The funerary tray of claim 1, wherein the first material is selected from the group consisting of plywood, particle board, OSB board, or an engineered wood-based material.

3. A funerary tray comprising:

a bottom wall formed at least in part from a rigid first material and defining a length and a width;

first and second sidewalls, each of the first and second side walls extending substantially vertically upward from long edges of the bottom wall;

first and second end walls, each of the first and second end walls extending substantially vertically upward from short edges of the bottom wall, such that the bottom wall, first and second side walls, and first and second end walls form a tray having a length and width configured to receive an adult human body;

a skin formed of a flexible second material, the skin extending over the first and second side walls, over the first and second end walls, and at least under a portion of the bottom wall, wherein the first material has a higher hardness than the second material;

wherein the first side wall has a side wall length that is substantially the length of the tray, and further comprises:

a rigid section extending a first length that is less than the side wall length, and at least a first corrugated fiberboard section having a second length that is less that the side wall length, wherein the rigid section has a greater hardness than the first corrugated fiberboard section.

4. The funerary tray of claim 3, wherein the rigid section of the first side wall extends substantially vertically upward from the bottom wall, and at least a part of the first corrugated fiberboard section extends substantially vertically upward from the bottom wall.

5. The funerary tray of claim 4, wherein the first end wall is formed of corrugated fiberboard, and is integrally formed with and foldably attached to the first corrugated fiberboard section of the first side wall.

6. The funerary tray of claim 5, wherein the second side wall has the side wall length and further comprises:

a second side wall rigid section extending the first length, and at least a first second side wall corrugated fiberboard section having the second length that is less that the side wall length;

and wherein the first second side wall corrugated fiberboard section is integrally formed with and foldably attached to the first end wall.

7. The funerary tray of claim 3, wherein the first side wall has a second corrugated fiberboard section, and wherein the rigid section is primarily disposed between the first corrugated fiberboard section and the second corrugated fiberboard section.

8. The funerary tray of claim 7, wherein an end portion of the first corrugated section and the rigid section overlap, and wherein an end portion of the second corrugated section and the rigid section overlap.

9. A funerary tray comprising:

a bottom wall formed at least in part from a first material and defining a length and a width;

first and second sidewalls, each of the first and second side walls extending substantially vertically upward from long edges of the bottom wall;

first and second end walls, each of the first and second end walls extending substantially vertically upward from short edges of the bottom wall, such that the bottom wall, first and second side walls, and first and second end walls form a tray having a length and width configured to receive an adult human body;

wherein the first side wall has a side wall length that is substantially the length of the tray, and further comprises a rigid section extending a first length that is less than the side wall length, and at least a first corrugated fiberboard section having a second length that is less that the side wall length, and wherein the rigid section is formed from a material that has a greater hardness than the first corrugated fiberboard section.

10. The funerary tray of claim 9, wherein the first material is a rigid material.

11. The funerary tray of claim 10, wherein the rigid section of the first side wall contacts and extends substantially vertically upward from the bottom wall, and at least a part of the first corrugated fiberboard section extends substantially vertically upward from the bottom wall.

12. The funerary tray of claim 11, wherein the first end wall is formed of corrugated fiberboard, and is integrally formed with and foldably attached to the first corrugated fiberboard section of the first side wall.

13. The funerary tray of claim 12, wherein the second side wall has the side wall length and further comprises:

a second side wall rigid section extending the first length, and at least a first second side wall corrugated fiberboard section having the second length that is less that the side wall length;

and wherein the first second side wall corrugated fiberboard section is integrally formed with and foldably attached to the first end wall.

14. The funerary tray of claim 11, wherein the first side wall has a second corrugated fiberboard section, and wherein the rigid section is primarily disposed between the first corrugated fiberboard section and the second corrugated fiberboard section.

15. The funerary tray of claim 14, wherein an end portion of the first corrugated fiberboard section and the rigid section overlap, and wherein an end portion of the second corrugated fiberboard section and the rigid section overlap.

16. A funerary tray, comprising:

a bottom wall formed of a rigid material, the bottom wall having first and second long edges, and first and second short edges;

a first end frame formed of corrugated fiberboard, the first end frame coupled to the bottom wall and extending upward from at least the first short edge to form a first end wall;

a second end frame formed of corrugated fiberboard, the second end frame coupled to the bottom wall and extending upward from at least the second short edge to form a second end wall, the second end frame separate from the first end frame;

a first side section extending along the first long edge and between the first end frame and the second end frame to form at least a portion of a first side wall; and a second side section extending along the second long edge and between the first end frame and the second end frame to form at least a portion of a second side wall;

wherein the bottom wall, first and second side walls, and first and second end walls form a tray having a length and width configured to receive an adult human body; and wherein each of the first side section and the second side section is formed of the rigid material, wherein the rigid material has a greater hardness than the corrugated fiberboard.

17. The funerary tray of claim 16, wherein the rigid material is selected from the group consisting of plywood, particle board, OSB board, or an engineered wood-based material.

* * * * *